United States Patent

Ewing et al.

[11] Patent Number: 4,819,811
[45] Date of Patent: Apr. 11, 1989

[54] SEPARATING APPARATUS WITH WOBBLING TAKE-UP ROLLER

[75] Inventors: Richard C. Ewing, Assonet; Walter V. Kuczewski, New Bedford; Gerald A. Thurber, Rehobeth, all of Mass.

[73] Assignee: Baader North America Corporation, New Bedford, Mass.

[21] Appl. No.: 95,666

[22] Filed: Sep. 14, 1987

[51] Int. Cl.⁴ .................. B07C 9/00; A22C 17/00
[52] U.S. Cl. ..................... 209/699; 17/1 G; 17/46; 99/495; 100/90; 198/631
[58] Field of Search .............. 209/617, 618, 699, 369, 209/920, 262; 198/631, 842, 456; 100/91, 90, 120, 121, 110; 99/495, 496; 17/46, 56, 1 G

[56] References Cited

U.S. PATENT DOCUMENTS

| | | | |
|---|---|---|---|
| 2,743,004 | 4/1956 | Wright | 198/842 |
| 3,396,768 | 8/1968 | Kurihara | 17/1 G |
| 3,829,931 | 8/1974 | Suerbaum | 17/46 |
| 4,087,001 | 5/1978 | Daisley | 198/456 |
| 4,637,094 | 1/1987 | Matsubayashi | 17/1 G |

FOREIGN PATENT DOCUMENTS

| | | | |
|---|---|---|---|
| 1011470 | 4/1984 | U.S.S.R. | 198/631 |
| 2093331 | 9/1982 | United Kingdom | 17/46 |

Primary Examiner—Robert B. Reeves
Assistant Examiner—Donald T. Hajec
Attorney, Agent, or Firm—Thomas R. Morrison

[57] ABSTRACT

A separating machine of a type having a foraminous drum with a resilient belt forming a nip therebetween includes a take-up, roller upstream of the nip, having an axis skewed with respect to an axis of the take-up roller. The wobbling motion of the take-up roller distorts the resilient belt sufficiently to overcome a tendency for entering items to bridge the nip.

4 Claims, 3 Drawing Sheets

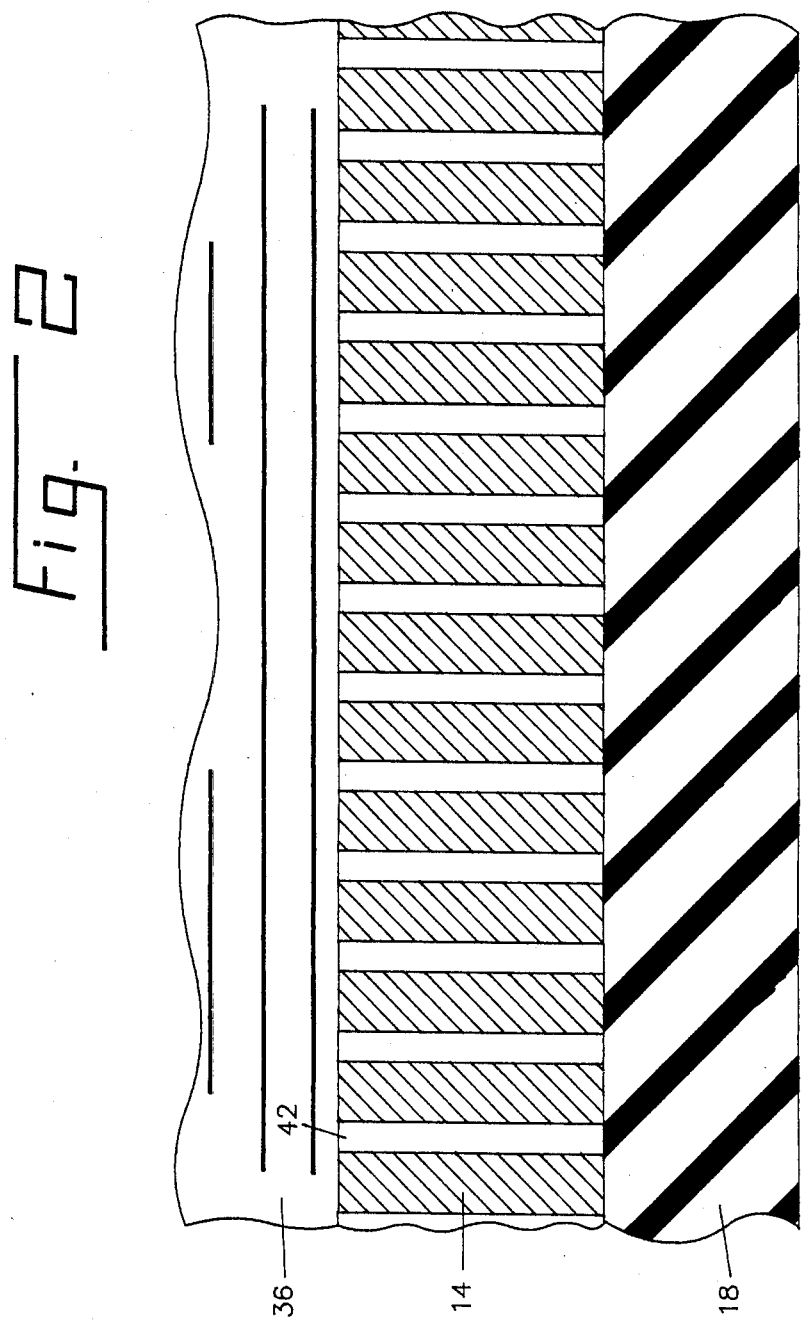

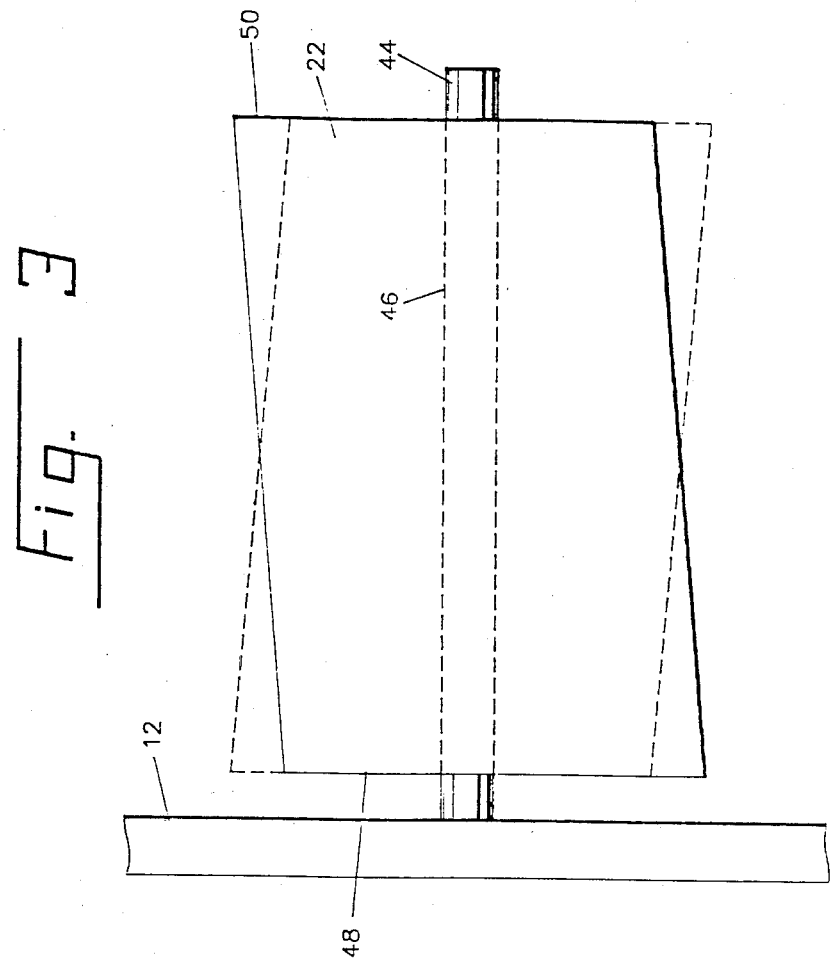

SEPARATING APPARATUS WITH WOBBLING TAKE-UP ROLLER

BACKGROUND OF THE INVENTION

The present invention relates to separating machines of a type having a rotating foraminous drum and a belt. Items to be separated are admitted to a nip between the drum and the belt. As the items travel between the drum and the belt, they are subjected to a pressure from a pressure roller effective for urging desired parts of the items through the foramina and into the interior of the drum. The remainder of the items remain outside the drum for separate removal.

Separating machines of the above type have been employed for separating the flesh of fish from their bones and skin. In addition, such machines have found applications in separating the flesh of fowl or animals from portions of the body where difficulty of removal by conventional means makes such removal uneconomic. As one example, which should not be taken as limiting, flesh removal from bones in turkey tails, backs, frames and necks represents substantial opportunities for increasing the economic value of an agricultural product.

The throughput of material to be separated depends on the rate at which such material can be entered into the nip between the foraminous drum and the belt. A problem exists in maintaining throughput of fatty materials, such as the above-listed turkey items. That is, the fat content of the flesh lubricates the drum and belt sufficiently to permit the material to bridge the nip and either slow or halt entry of the material therein.

OBJECTS AND SUMMARY OF THE INVENTION

Accordingly, it is an object of the invention to provide a separating machine which overcomes the drawbacks of the prior art.

It is a further object of the invention to provide a separating machine having means for urging entry of material to be separated into a nip between a foraminous drum and a belt.

It is a still further object of the invention to provide a separating machine including means for cyclically wobbling the belt upstream of the nip between the belt and the foraminous drum, whereby items to be separated are prevented from bridging the nip.

Briefly stated, there is provided a separating machine of a type having a foraminous drum with a resilient belt forming a nip therebetween. A take-up roller, upstream of the nip, has an axis skewed with respect to an axis of the take-up roller. The resulting wobbling motion of the take-up roller distorts the resilient belt sufficiently to overcome a tendency for entering items to bridge the nip.

According to an embodiment of the invention, there is provided a separating machine comprising: a separating drum, a plurality of foramina penetrating the separating drum, a resilient belt reeved over the separating drum, a pressure roller applying pressure through the resilient belt to a surface of the separating drum, whereby material to be separated disposed between the resilient belt and the pressure roller is urged through the plurality of foramina into an interior of the separating drum and a remainder of material remains on a surface of the separating drum, at least one take-up roller, the at least one take-up roller being disposed upstream of the separating drum and being effective for shaping the resilient belt to form a nip with a surface of the separating drum, and the at least one take-up roller including means for causing it to wobble with respect to an axis thereof, whereby the belt is caused to wobble approaching the nip and a tendency for bridging the nip is overcome.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a cross section taken along II—II in FIG. 1.

FIG. 3 is a view of a wobbling roller according to an embodiment of the invention.

DETAILED DESCRIPTION OF THE PREFERRED EMBODIMENT

Figure 1:
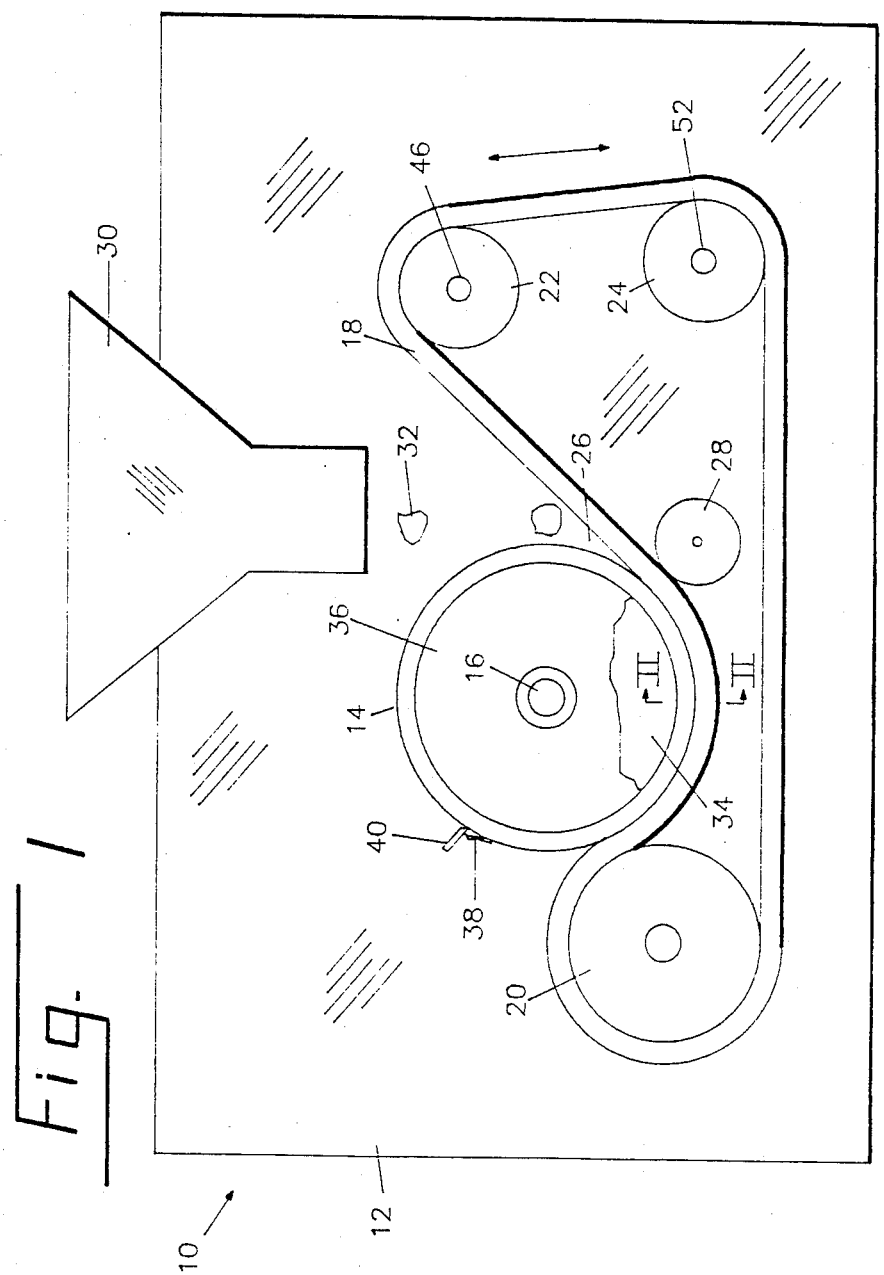
FIG. 1 is a side schematic view of a separating machine from which covers and guards are removed to reveal internal components.

Referring now to FIG. 1, there is shown, generally at 10, a separating machine according to an embodiment of the invention. A machine frame 12 supports a foraminous drum 14 rotatable on an axis 16 by conventional equipment (not shown) hidden behind machine frame 12. A thick resilient belt 18 is reeved between foraminous drum 14 and a pressure roller 20. First and second take-up rollers 22 and 24 shape resilient belt 18 to form a nip 26 between an exterior surface of foraminous drum 14 and resilient belt 18. One or more support rollers 28 are optionally provided for flattening material to be separated between foraminous drum 14 and resilient belt 18.

A feed hopper 30 feeds items to be separated 32 into nip 26.

During operation, desired material 34 is urged through foramina (not shown) in foraminous drum 14 into an interior 36 of foraminous drum 14. Conventional means (not shown) such as, for example, a stationary auger, may be provided for removing desired material 34 from interior 36. Undesired material 38 such as, for example, bone, skin and sinew, remain on the external surface of foraminous drum 14 from whence it is scraped off by a scraper blade 40.

Some types of items to be separated 32 are preferably preprocessed before being fed into nip 26. Bony materials such as, for example, turkey frames and turkey necks are preferably processed by a crusher to fracture bones to facilitate entry between resilient belt 18 and foraminous drum 14.

Even with such preprocessing, however, I have discovered that items to be separated 32 can bridge nip 26 and slow or halt throughput.

Referring now to FIG. 2, foraminous drum 14 is seen to include a plurality, of foramina or holes 42 passing completely therethrough. Flesh of items to be separated 32 (FIG. 1) trapped between resilient belt 18 and foraminous drum 14 is expressed through holes 42 into interior 36, while items such as bone, skin and sinew remain between resilient belt 18 and foraminous drum 14. In this manner, separation is attained.

Referring now to FIG. 3, take-up roller 22 is disposed on a shaft 44 affixed to machine frame 12. It will be noted that a shaft hole 46 in take-up roller 22 is skewed with respect to a longitudinal axis thereof. Accordingly, as take-up roller 22 rotates, it wobbles between the extremes illustrated in solid and dashed lines. First and second ends 48 and 50 preferably define planes normal to an axis of shaft hole 46.

Referring again to FIG. 1, the wobbling motion of the surface of take-up roller 22 tends to distort resilient belt 18 as it approaches nip 26. More specifically, such wobbling tends to propagate a wave of alternate slackening and tightening back and forth across the width of resilient belt 18 (into and out of the page in FIG. 1). Such slackening and tightening tends to dislodge any items to be separated 32 bridging nip 26 whereby such items to be separated 32 are entered into nip 26 for separating in the manner described above.

Although the exact details of the manner of driving the apparatus of the present invention are not of concern to the present invention, either foraminous drum 14 or pressure roller 20, or both, may be driven by apparatus hidden behind machine frame 12. In addition, one or both of take-up rollers 22 and 24 may also be driven. I have found that take-up roller 22 is preferably provided with flutes (not shown) on its surface for aiding in imparting a driving torque to it from resilient belt 18.

One skilled in the art will recognize that a wobbling roller alternately stretches and relaxes each edge of resilient belt 18. One technique for removing such stretching and relaxation includes providing a take-up roller 24 having a shaft hole 52 skewed identically to shaft hole 46. Take-up rollers 22 and 24 may be connected together for concerted rotation in opposite phases with respect to each other. That is, when take-up roller 22 is rotated to a position tending to stretch one edge of resilient belt 18, take-up roller 24 is rotated into a compensating position tending to relax the same edge by the same amount.

The amount of wobble imparted to take-up roller 22 may vary from application to application. I have found that, in a separating machine 10 using a foraminous drum 14 having a diameter of about 14 inches and a take-up roller 22 having a diameter of about 8 inches and a length of about 12 inches, an offset of a center of ends 48 and 50 from an axis of shaft hole 46 of from about 0.25 to about 1.0 inch improves throughput of turkey necks. For this application, an offset of about 0.75 inches appears to give best results. The throughput with different machine dimensions or products to be separated may be optimized with different offsets. However, one skilled in the art, having the present disclosure for reference, should be fully enabled to determine the required differences.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A separating machine comprising:
   a separating drum;
   a plurality of foramina penetrating said separating drum;
   a resilient belt reeved over said separating drum;
   a pressure roller applying pressure through said resilient belt to a surface of said separating drum, whereby material to be separated disposed between said resilient belt and said pressure roller is urged through said plurality of foramina into an interior of said separating drum and a remainder of material remains on a surface of said separating drum;
   at least one take-up roller;
   said at least one take-up roller being disposed upstream of said separating drum and being effective for shaping said resilient belt to form a nip with said surface of said separating drum; and
   means for wobbling said at least one take-up roller with respect to an axis thereof, whereby said resilient belt is caused to wobble approaching said nip and a tendency for bridging said nip is overcome.

2. A separating machine according to claim 1, wherein:
   said at least one take-up roller includes first and second take-up rollers;
   both of said first and second take-up rollers including said means for wobbling effective for causing them to wobble equal amounts and in opposite phases, whereby stretching of said resilient belt is avoided.

3. A separating machine comprising:
   a separating drum;
   a plurality of foramina penetrating said separating drum;
   a resilient belt reeved over said separating drum;
   a pressure roller applying pressure through said resilient belt to a surface of said separating drum, whereby material to be separated disposed between said resilient belt and said pressure roller is urged through said plurality of foramina into an interior of said separating drum and a remainder of material remains on a surface of said separating drum;
   at least one take-up drum;
   said at least one take-up roller being disposed upstream of said separating drum and being effective for shaping said resilient belt to form a nip with said surface of said separating drum; and
   means for wobbling said at lest one take-up roller with respect to an axis thereof, whereby said resilient belt is caused to wobble approaching said nip and a tendency for bridging said nip is overcome;
   said means for wobbling including a shaft hole in said at least one take-up roll skewed with respect to an axis of said at least one take-up roller.

4. A separating machine according to claim 3 wherein said at least one take-up roller includes first and second ends, said first and second ends defining planes normal to said shaft hole.

* * * * *